Figure 1:
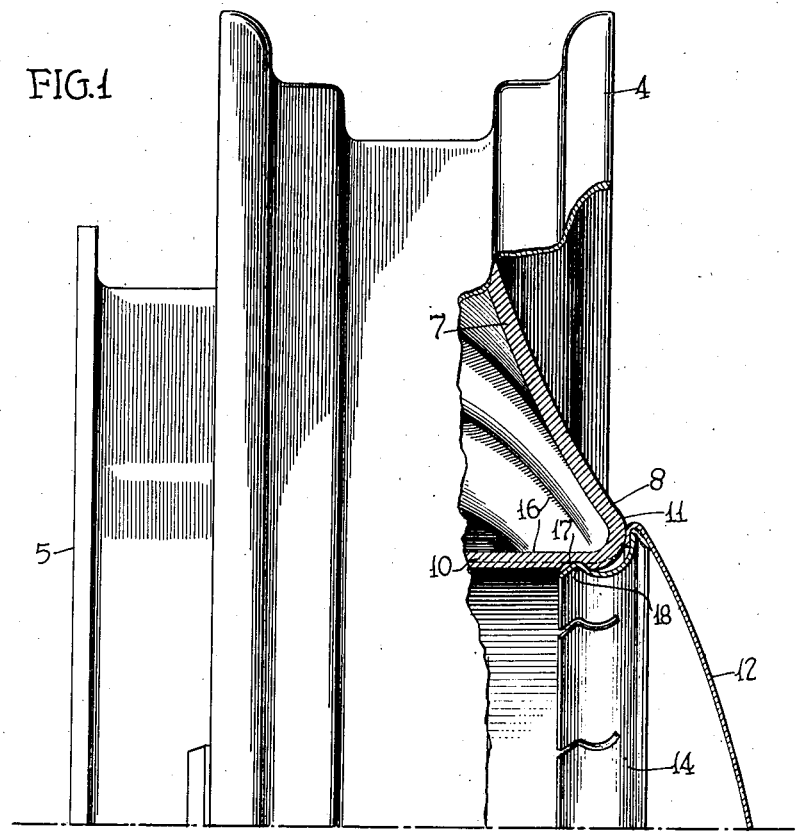

Nov. 2, 1937.     C. L. EKSERGIAN     2,098,205
WHEEL STRUCTURE
Original Filed June 28, 1933

INVENTOR.
CAROLUS L. EKSERGIAN.
BY John P. Tarbox
ATTORNEY.

Patented Nov. 2, 1937

2,098,205

UNITED STATES PATENT OFFICE 2,098,205

WHEEL STRUCTURE

Carolus L. Eksergian, Detroit, Mich., assignor to Budd Wheel Company, Philadelphia, Pa., a corporation of Pennsylvania Application June 28, 1933, Serial No. 677,970
Renewed March 11, 1937

3 Claims. (Cl. 301—108)

This invention relates to wheel structures and particularly to means for mounting hub caps thereon.

More particularly, the invention relates to vehicle wheels of sheet metal and to a novel method of shaping the hub shell portions thereof, whereby to provide hub cap receiving and holding portions thereon.

One object of the invention is to avoid the use of delicate or projecting parts usually employed in holding hub caps. Other objects of this invention are to dispense with welding operations in providing a wheel with hub cap mounting means, to avoid the necessity for having initially separate hub cap holding parts which must be attached to a wheel, and to provide a wheel body in which the hub cap holding means is protected from damage by contact with other bodies during manufacture, assembly, shipping and other handling, and also in service when the caps are removed and replaced.

Another feature is to reduce the number of parts and manufacturing operations of a hub cap holding means to substantially a minimum and further to provide a device of the above indicated character that shall be simple and desirable in construction, economical to manufacture and effective in its operation.

In vehicle wheel practice, particularly in connection with wheels of the sheet metal type, it has been usual to provide, at perimetrally spaced positions about the front end of the hub shells, holding devices of various kinds, whereby the caps may be mounted on, and removed from, the shells with a snap or spring action.

This result has been obtained in various ways, such as providing comparatively delicate spring elements, welded-on fingers or buttons, projecting tabs and the like, most of which require separate fabricating or welding operations, are easily damaged and are objectionable in other ways.

This invention contemplates dispensing with such devices by providing a simple hub shell with locally formed portions homogeneously integral therewith of rugged character, which are protected by surrounding parts and are improvements generally as hub cap mounting means.

I attain the previously enumerated objects by constructing a pressed metal vehicle wheel with a substantially annularly extending portion having grooved parts thereof providing a hub cover holding means.

To these ends, a generally cylindrical sheet metal hub shell or equivalent part is bent or pressed to provide flat areas or chords perimetrally spaced thereabout and extending axially therealong. After this operation, a grinding tool is inserted in the shell to operate tangentially against the chords, whereby the latter are provided with perimetral grooves, preferably not extending through the shell but to a substantial depth, whereby to provide transverse shoulders for longitudinally or axially holding snap on fingers on the hub cap.

In this manner, the shell and its cap holding elements are all in one rugged self-contained unit, in which the elements are not delicate, are not separate, are not easily injured, and do not require separate welding on operations, and a structure is provided which is generally more effective and durable than previous devices of its kind.

Figure 2:
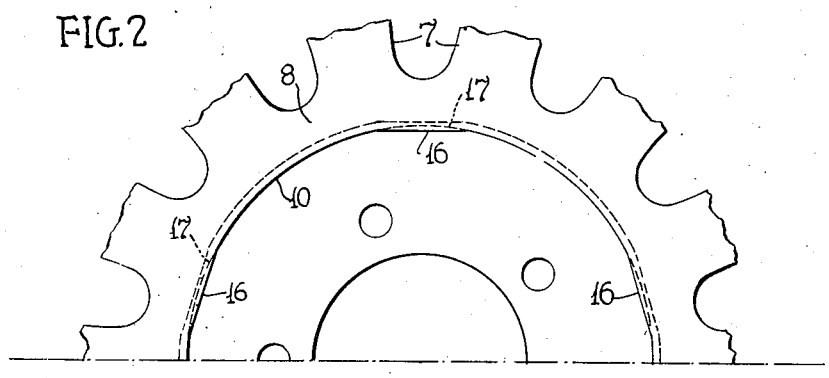

Figure 1 of the accompanying drawing is a view, partially in elevation and partially in section, viewed in the direction of the wheel plane, of a wheel embodying the invention, and Figure 2 is a detail or fragmentary view in front elevation, of the wheel body or spider, showing the hub shell, the nave and portions of the spokes.

The wheel, generally, comprises a rim 4, shown as of the drop center type, a brake drum 5, a spider or body including spokes 7, a nave 8 and a hub shell 10 joined to the nave about a portion 11 of easy curvature, and a hub cap comprising an end portion 12, and an inner ring 14.

The constructions of the rim, the brake drum and the spider generally, are not particularly germane to this invention, and are shown merely to illustrate one application or use which the invention may have.

The hub shell is preferably of substantial gauge or thickness and generally of substantially cylindrical shape having flattened, or substantially chord elements 16 spaced annularly thereabout and extending axially therealong.

With the hub shell so formed, a suitable tool or wheel is inserted axially into the shell and then moved radially so that, with the grinding wheel parallel to the wheel plane, it is placed tangentially against the chords 16 to provide grooves 17 therein. This operation thereby forms transverse or wheel plane shoulders between which a bead portion 18 on the hub cap ring 14 may snap into, or out of position in response to axial movement of the cap.

Two of such grooves 17 may be provided adjacent to each other to provide a ridge therebetween, over which a portion of the ring 14 may snap, and other obvious modifications be effected.

Also, the shell may be of various gauges and the grooves of various depths, or extend through the shell.

The grooves may also be constructed by radial pressure, instead of grinding, or, if the shell be cast, grooves or ribs may be formed by molds. It is further contemplated that the grooves or ribs may be on the outer side of the shell or nave which may readily be modified for such purpose, and a similar cover structure provided for any other part of the wheel.

Although there is shown and described a particular form of the invention, changes may be effected therein without departing from the spirit and scope thereof, as set forth in the appended claims.

What I claim is:

1. In a wheel, an axially extending nave portion of sheet metal having formed around its perimeter flattened or substantially chord elements, said elements being annularly spaced and radially inwardly pressed from the main body axially therealong, said flattened chord elements having grooves formed on the face thereof in the wheel plane constituting axially inwardly facing shoulders, in combination with a hub cap having annular axially inwardly extending individually yieldable portions adapted to be moved into and be retained in axial holding relation to said grooves when these portions of the hub cap are axially telescoped within the nave portion.

2. In a wheel, a sheet metal body having an axially extending nave portion merging at its axially outer end into a generally radially outwardly extending portion, said axially extending nave portion having formed around its perimeter spaced radially inwardly depressed portions formed from the body metal, axially inwardly facing shoulders provided on said depressed portions all in the same transaxial plane, in combination with a hub cap having annularly arranged radially yieldable portions adapted to be moved into and retained in axial holding relation to said shoulders when these portions of the hub cap are axially telescoped with the nave portion.

3. In a wheel, a sheet metal body having an axially extending nave portion merging at its axially outer end into a generally radially outwardly extending portion, said axially extending nave portion having formed around its perimeter spaced inwardly extending depressed portions formed from the body metal, said depressed portions having formed thereon axially inwardly facing hub cap locking shoulders all in the same transaxial plane.

CAROLUS L. EKSERGIAN.